United States Patent [19]

Depoli

[11] Patent Number: 4,875,565
[45] Date of Patent: Oct. 24, 1989

[54] COUPLING WITH TWO CLUTCHES, ESPECIALLY FOR LOOMS

[75] Inventor: Erminio Depoli, Crema, Italy

[73] Assignee: Baruffaldi S.p.A., San Donato Milanese, Italy

[21] Appl. No.: 165,790

[22] Filed: Mar. 9, 1988

[30] Foreign Application Priority Data

Dec. 30, 1987 [IT]  Italy .................................. 23268 A/87

[51] Int. Cl.⁴ ....................... D03D 51/02; F16D 27/12
[52] U.S. Cl. ..................................... 192/48.2; 139/1 E
[58] Field of Search ......... 139/1 E; 192/48.2, 84 AA, 192/84 AB, 90

[56] References Cited

U.S. PATENT DOCUMENTS

| | | | |
|---|---|---|---|
| 3,175,665 | 3/1965 | Albrecht | 192/84 AA |
| 3,321,827 | 5/1967 | Klinkenberg et al. | 192/84 AA X |
| 3,390,548 | 7/1968 | Rogerson et al. | 192/84 R X |
| 3,390,749 | 7/1968 | Popisil et al. | 192/84 R X |
| 4,428,404 | 1/1984 | Kleiner | 139/1 E |
| 4,509,629 | 4/1985 | Pajgrt et al. | 192/0.098 |
| 4,572,343 | 2/1986 | Bofelli | 192/48.2 X |
| 4,592,392 | 6/1986 | Vandeweghe et al. | 139/1 E |

FOREIGN PATENT DOCUMENTS

| | | |
|---|---|---|
| 0086999 | 8/1983 | European Pat. Off. . |
| 0161012 | 8/1983 | European Pat. Off. . |
| 2222151 | 11/1972 | Fed. Rep. of Germany . |
| 2509665 | 9/1976 | Fed. Rep. of Germany . |
| 2520762 | 3/1983 | France . |
| 649032 | 1/1951 | United Kingdom . |

*Primary Examiner*—Rodney H. Bonck
*Attorney, Agent, or Firm*—Herbert Dubno

[57] ABSTRACT

A double-clutch coupling for looms, which comprises a first controllable clutch coupling a drive shaft connected to a first member of the loom to a driven shaft connected to a second member of the loom, movable in synchronism with the first and coaxial with the drive shaft. A second controllable clutch couples the driven shaft to an auxiliary motor device. The clutches are equipped with respective actuating electromagnets acting in opposition to springs. The clutches each comprise an annular electromagnet rigidly connected to a fixed support shell inside which the drive shaft and driven shaft are supported with their axes in a fixed position. The electromagnet is at least partly contained by a rotor axially fixed with respect to it and linked with the magnetic flux generated by the electromagnet itself when it is energized. In front of each rotor there is an annular armature, axially movable under the action of the magnetic field generated by the relevant electromagnet in opposition to the spring. The armatures are rotatably locked respectively to the drive shaft and driven shaft and carry the movable members of the clutches.

6 Claims, 5 Drawing Sheets

COUPLING WITH TWO CLUTCHES, ESPECIALLY FOR LOOMS

FIELD OF THE INVENTION

The subject of the present invention is a coupling having a double clutch, especially for looms, for the transmission of motion to the dobby and, if the weft thread should break during weaving, for reversing it to arrive at the point of the breakage in the thread itself, thus enabling continuity to be resumed.

BACKGROUND OF THE INVENTION

Looms usually possess devices for conveying the weft yarn or yarns and devices for handling the yarns forming the warp, known as dobbies, which move in synchronism with the former to form the desired woven design.

During weaving, it is possible for breakages of the weft yarn to occur and in such cases, for the purpose of preventing a defect from occurring in the finished piece, it is necessary to interrupt weaving and, while holding the devices for conveying the weft yarn stationary, to actuate the dobby in reverse thus unpicking the woven fabric formed from the moment of rupture to the moment where the loom was stopped, thereby enabling continuity of the interrupted weft yarn to be restored.

For this purpose it is then necessary to separate the dobby from the loom and to effect its reverse movement with an auxiliary motor device, operating at low speed, as far as the desired position.

In order to start weaving again, it is therefore necessary to restore the coupling between loom and dobby, by bringing them into the relative angular position corresponding to the instant at which they were separated, thereby ensuring synchronism between the relative movements in the manner in which it existed before the interruption.

For this purpose, couplings having two clutches are in use, such devices permit the loom to be coupled to the dobby by the first clutch and enable them to be separated in order to connect the dobby, by means of the second clutch, to an auxiliary drive device, by means of which the independent motion of the dobby itself can be obtained.

The coupling between loom and dobby in the correct angular position for starting weaving again is assured by the presence of asymmetrical members in the respective clutch, which permit the closure of the clutch itself only in the desired position.

Couplings of this class are known, for example, from German Pat. No. 2,509,665, German Pat. No. 2,222,151, French Pat. No. 2,520,762, European Pat. No. 0,086,999, British Pat. No. 649,032, and U.S. Pat. Nos. 3,175,665, 3,390,749, 4,428,404 and 4,592,392.

Among the foregoing, the German Pat. No. 2,509,665 (LENTZ) discloses a search mechanism for the weft for looms, which comprises two clutches, of which one is interposed between a driving component and a driven component of the principal shaft of the machine, while the second clutch is interposed between the driven component and an auxiliary motor, for actuating the driven component in reverse motion German Pat. No. 2,222,151 (NUOVO PIGNONE), discloses a search mechanism for the weft for looms, in which there is an electromagnetic clutch and an electromagnetic brake U.S. Pat. No. 4,428,404 (Kleiner, assigned to STAUBLI Ltd.) discloses a low-velocity search mechanism for the weft for looms, which is composed of two mechanically actuated clutches for coupling a driven shaft to a motor shaft or to an auxiliary motor, these being arranged coaxially and capable of being engaged independently with separate controls U.S. Pat. No. 3,390,749 (Pospisil, Boucek, Elias, assigned to VYZKUMNY USTAV BAVLNARSKY) has a double clutch, with independent electromagnetic actuation of each clutch.

Furthermore, U.S. Pat. No. 4,592,392 (Wandeweghe-Derde, assigned to N. V. WEEFAUTOMATEN PICANOL) has a search mechanism for the weft for looms, in which, as for the preceding mechanisms, the drive shaft and the driven shaft are connected by a first clutch, having springs with electromagnetic disengagement, while a second clutch, electromagnetically actuated, connects the driven shaft to the auxiliary motor device this coupling differs substantially from these described earlier by its mechanical arrangement, which provides the presence of an axially fixed, central element, linked to the end of the driven shaft, which carries at opposite sides fixed clutch elements for the controlled rotational coupling with it of corresponding, axially slidable clutch elements, rotatably connected respectively to the driving shaft and to transmission elements coupled with the auxiliary motor device.

Such a mechanism possesses, in its construction, certain limitations and disadvantages, resulting from the fact that one of the clutches, intended for coupling the drive shaft with the driven shaft, has the rotor only partly surrounding the pole piece of the electromagnet, whereas the armature of the clutch extends externally of the electromagnet to complete the magnetic circuit.

The other of the clutches, intended for coupling the driven shaft with the auxiliary motor device, has its rotor, surrounding the pole piece of the associated electromagnet, intended for axial translatory movement for passing from the closed clutch position to the open clutch position. In both cases, therefore, the members intended for forming the magnetic circuits of the relevant electromagnets are also required to carry out axial movements. This means that these components must be constructed with sufficient play to permit the axial sliding intended for engagement and disengagement, so that it is necessary to prevent such movements from being obstructed by friction and the like. However, the clearances required for this purpose give rise to a large air gap, in the radial direction, between the elements of the magnetic circuit and to irregular variations in this air gap, producing losses in the value of the attraction force of the electromagnets and consequent irregularities in operation.

The rotor of the clutch for connecting the driven shaft with the auxiliary motor is also subjected to axial sliding on the surface of the respective support bearing. On the one hand, this necessitates radial clearances in the coupling of the bearing, with the aforementioned disadvantages associated with the increase in the magnetic air gap, and on the other hand such sliding movement can lead to friction and crawling, or to contact between rotor and electromagnet, with dispersion in the magnetic field generated.

Furthermore, said rotor, being subjected to movements in the axial direction between the engagement and disengagement positions, can be rotatably coupled to the auxiliary motor device only by means of a transmission which permits the axial displacement, such as a chain, belt or straight-toothed cylindrical gear, so that transmissions which require constancy in the positions of the coupled devices are precluded. These include transmission having gears with converging or skew axes, including the type with worm and helical gear wheel, which would offer in particular the advantage of directly achieving a high reduction ratio, without the adoption of further reduction units being necessary.

There is also known, from German Pat. No. 32 29 192, in the name of ZAHNRADFABRIK FRIEDRICHSHAFEN AG, a toothed clutch which possesses a rotor rotatable inside a fixed electromagnet, with an axially movable armature extending laterally outside the electromagnet, closing the magnetic circuit onto the electromagnet. The armature carries a set of teeth on its face capable of engaging with the corresponding set of teeth of a driven ring and it is pressed onto the ring by springs placed between the rotor and the armature.

This construction is in every way similar to that of the first of the of the N. V. WEEFAUTOMATEN PICANOL patent clutches already cited, and is intended for coupling the driving shaft to the driven shaft, which possesses, as stated, the rotor only partly surrounding the pole piece of the electromagnet, whereas the armature of the clutch extends externally of the electromagnet to complete the magnetic circuit. The clutch thus possesses the disadvantages already cited, deriving from the need to use a large air gap between the fixed electromagnet and the armature, in order to ensure the axial sliding of the latter without crawling.

OBJECT OF THE INVENTION

It is the object of the invention to provide a coupling having a double clutch for looms, which can overcome the aforementioned disadvantages, possessing electromagnetic clutches having a reduced air gap dimension, not possessing components subjected to friction in the engagement or disengagement phases, and which shall moreover allow any transmission means to be adopted between auxiliary motor and armature capable of being coupled to the driven shaft, in particular transmissions having cylindrical, conical, helical or similar gears, according to the requirements.

SUMMARY OF THE INVENTION

These results are achieved by the present invention, which provides a coupling having two clutches, especially for looms, which comprises a first controllable clutch, by means of which a driving or principal shaft, connected to a first, autonomously driven member of the loom, is coupled to a driven shaft connected to a second member of the loom capable of moving in synchronism with the former and coaxial with the driving shaft. The coupling comprises a second controllable clutch, coupling the driven shaft to an auxiliary motor device. The clutches are equipped with respective actuating electromagnets, acting in contrast to elastic means. The clutches each comprise an annular electromagnet, rigidly connected to a fixed support shell, inside which shell the driving and driven shafts are supported with their axes in a fixed position. The which electromagnet is at least partly contained by a rotor axially fixed with respect to it and linked with the magnetic flux generated by the electromagnet itself when it is energized. In front of each rotor there is present, on the opposite side from the electromagnet, an annular armature axially movable under the action of the magnetic field generated by the associated electromagnet, in opposition to the elastic means. The armatures are keyed respectively to the driving shaft and to the driven shaft, and carry the movable members of the clutches, in correspondence with which there are provided fixed members of the clutches, carried respectively by a flanged element integral with the driven shaft and by the rotor of the second clutch, carrying integral means for connection to the auxiliary motor device.

The first clutch, connecting the motor shaft to the driven shaft, can comprise a disc integral with the motor shaft, constituting the rotor of the clutch, having on one face an annular depression inside which there is located, with reduced radial air gap, the pole piece of an annular electromagnet for electromagnetic actuation, coaxial with it and rigidly linked to an external fixed shell. Inside the shell, the motor shaft is supported with its axis in a fixed position. To the disc a ring, constituting the armature of the clutch, is keyed in an axially movable and rotationally fixed manner, and is equipped with front clutch members capable of being engaged with corresponding clutch members of a flanged element facing it and rigidly keyed to the driven shaft. Elastic elements are interposed between the disc integral with the driving shaft and the ring, these elements being adapted for thrusting the ring into an engagement position of the relevant clutch members with the flanged member, in opposition to the action of the electromagnet when it is energized.

The second clutch, connecting the driven shaft to the auxiliary motor device, comprises a wheel rotatably mounted on the driven shaft and axially fixed, constituting the rotor of the clutch, having on one face an annular depression, inside which there is situated, with reduced radial air gap, the pole piece of an annular electromagnet for electromagnetic actuation, coaxial with it, rigidly keyed to a shell. Inside the shell the driven shaft is supported with its axis in a fixed position. The wheel carries axially fixed means for rotatably coupling to the auxiliary motor device, and in front of it there is supported, on the flanged element, a ring axially movable but rotationally keyed to the flanged element. This ring constitutes the armature of the clutch, and is equipped with front clutch members capable of being engaged with corresponding clutch members of the wheel facing and in front of it. Elastic elements are present interposed between the flanged element and the ring, these elastic elements being adapted to keep the ring in a position of disengagement of the relevant clutch members from the wheel, in opposition to the action of the electromagnet when it is energized.

The axially fixed means for rotatably coupling to the auxiliary motor device can be constituted of a helical set of teeth situated on the periphery of the wheel, which is rotatably supported on the driven shaft and is axially fixed, with which set of teeth a worm is directly engaged, this worm being keyed on the shaft of the auxiliary motor device.

The rings constituting the armatures of the clutches are keyed, respectively, to the disc connected to the drive shaft and to the flanged element integral with the driven shaft, by means of respective flexible rings, attached alternately to the ring and to the disc or the flanged element. The elastic elements interposed between the flanged element and the ring, adapted for keeping the ring in a disengagement position of the relevant clutch members with the wheel, in opposition to the action of the electromagnet, are constituted of the same flexible annular strip locking the ring to the flanged element.

BRIEF DESCRIPTION OF THE DRAWING

The above objects, features and advantages of my invention will become more readily apparent from the following description, reference being made to the accompanying drawing in which.

SPECIFIC DESCRIPTION

Figure 1:
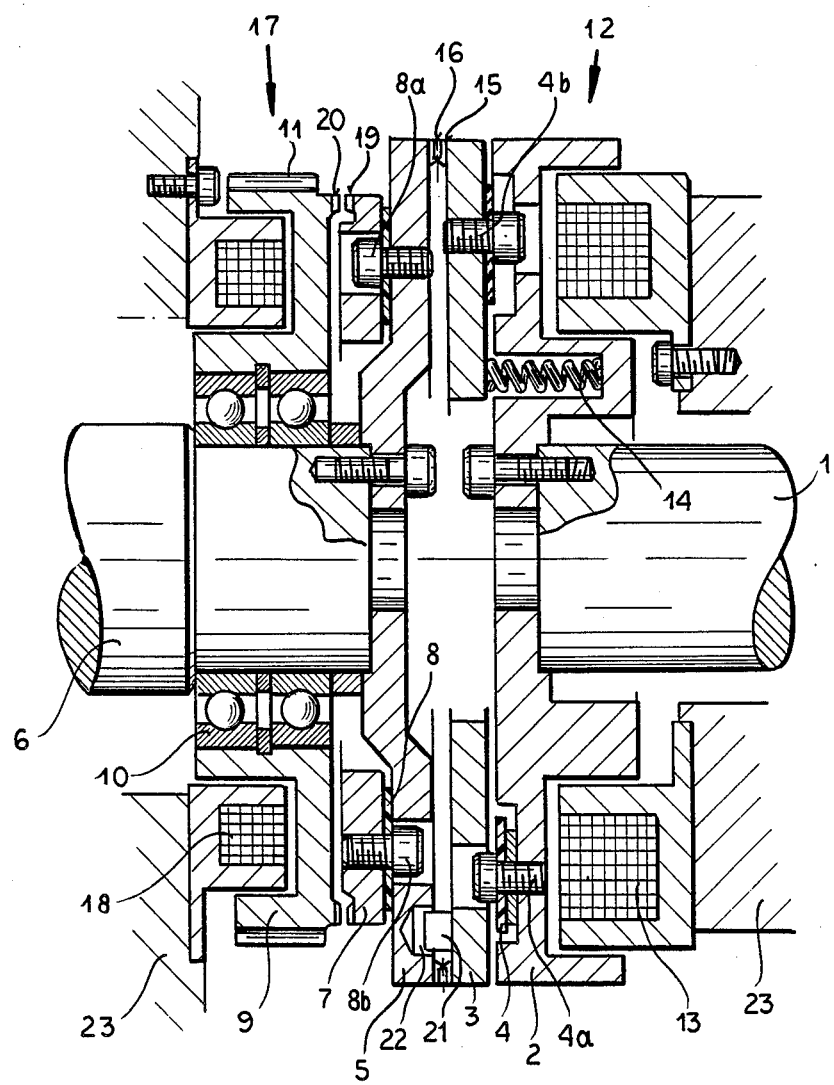
FIG. 1 is an axial section of the coupling according to this invention, in the condition of transmission of motion from the motor shaft to the driven shaft.

FIG. 1 shows, the coupling according to this invention provides a shaft 1, connected to the devices for weaving the weft of a loom, not shown, hereinafter termed for short the shaft of the loom, which carries at its end a disc 2 equipped with a clutch ring 3, the clutch ring being rotatably keyed to it by means of a flexible ring 4, connected alternately to the disc 2 and to the ring 3 by means of respective screws 4a, 4b. The clutch ring is capable of being engaged at the front with a flanged element 5 integral with a shaft 6, which actuates the members of the loom for handling the warp, or dobby, the latter being hereinafter termed, for short, the shaft of the dobby.

The flanged element 5, in its turn, carries integrally in rotation with it, a clutch ring 7, connected to it by means of a flexible ring 8, attached alternately to the flanged element 5 and to the ring 7 by means of respective screws 8a, 8b; the clutch ring 7 can be engaged with a wheel 9, freely rotating on the shaft 6 by means of relevant bearings 10 and equipped with members for coupling with an auxiliary motor device, these members being composed, for example, of a set of teeth 11, adapted for engaging with corresponding gears of an auxiliary motor device.

The disc 2 constitutes the rotor of a first clutch, generally referenced 12, and surrounds a fixed, annular electromagnet 13, integral with a fixed support component, the magnetic field of which acts by attracting the clutch ring 3, of ferromagnetic material, towards the disc 2 in opposition to springs 14, interposed between the disc 2 and the ring 3, and by flexing the flexible annular strip 4; in this manner, the electromagnet 13, when it is energized, keeps the front sets of teeth 15, 16, respectively of the ring 3 and of the flanged element 5, in a disengaged position, thereby permitting independent rotation of the shafts 1 and 6 keyed to them.

The wheel 9 constitutes the rotor of a second electromagnetic clutch, referenced generally at 17, and surrounds a fixed, annular electromagnet 18, integral with the fixed support member, the magnetic field of which acts by attracting the clutch ring 7, of ferromagnetic material, towards the wheel 9 in opposition to the elastic annular strip 8; in this manner the electromagnet 18, when it is energized, brings the front sets of teeth 19, 20 respectively of the ring 7 and of the wheel 9, into engagement condition, thereby rotatably coupling the shaft 6 and the wheel 9.

The ring 3 furthermore carries studs 21, located in asymmetrical positions, in correspondence with which holes 22 are present on the flanged element 5, into which holes the studs 21 engage when the front sets of teeth 15, 16 are in engagement, thus ensuring unambiguousness of the angular coupling position between the shaft 1 and the shaft 6. With advantageously, the studs 21 are three in number. The positions of the three studs and of the corresponding holes are arranged asymmetrically in such a manner as to make possible engagement between the ring 3 and the flanged element 5, with insertion of the studs 21 into the holes 22, in one single angular position, whereas in every other position the three studs 21 bear against the surface of the flanged element 5, so as to keep the ring 3 permanently perpendicular to the axes of the shafts 1 and 6, thereby preventing oscillations that might be the cause of possible crawling or incorrect coupling between the sets of teeth 15, 16.

Figure 4:
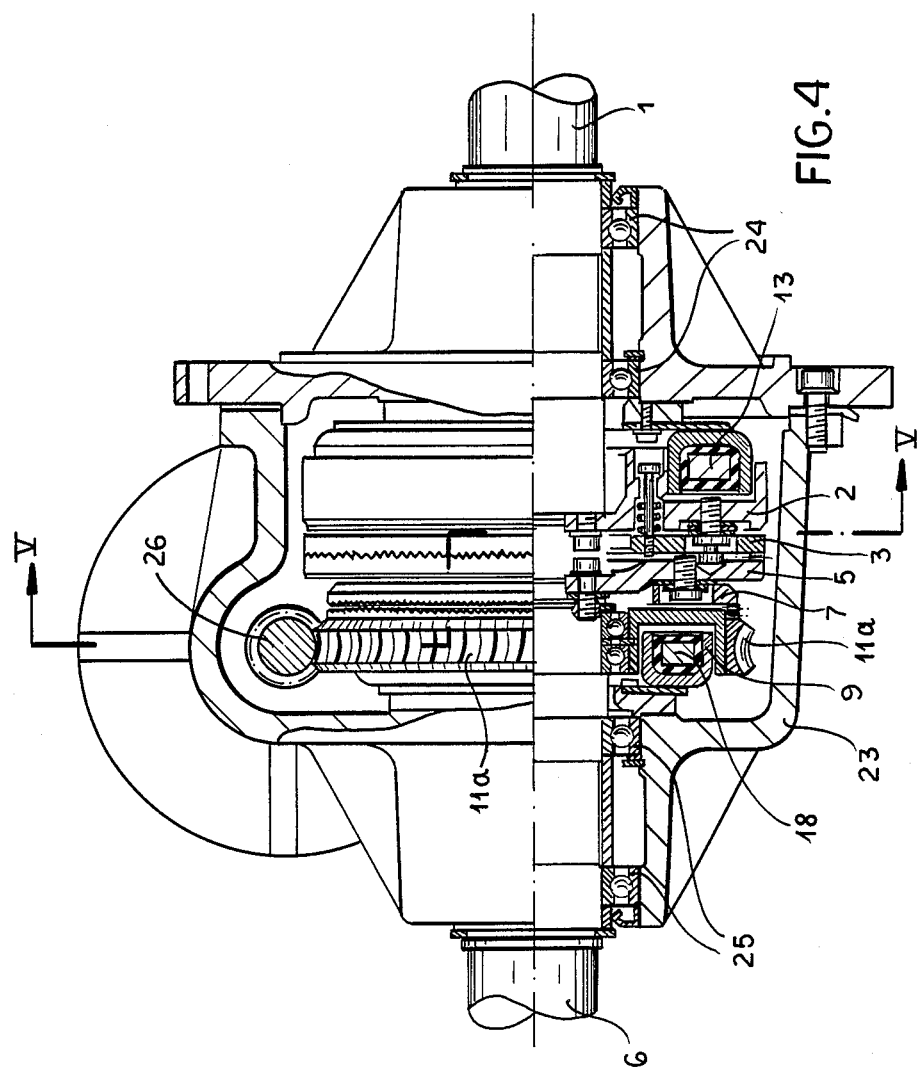
FIG. 4 is an axial section of the coupling according to this invention, mounted inside.

As FIG. 4 shows, the coupling in its totality is advantageously housed in an external support shell 23, inside which the shaft of the loom 1 and the shaft of the dobby 6 are supported by respective bearings 24 and 25, which assure for them the correct position in alignment.

The external shell 23 also houses, in the arrangement illustrated by way of example, the worm 26 which engages with the wheel 9, having the helically toothed ring 11a; the worm 26, supported by the respective bearings 27, 28 in the shell 23, is in its turn connected to the auxiliary motor 29.

As will be evident from the foregoing description, the first electromagnetic clutch 12 has the function of rotatably coupling the loom shaft 1 and the dobby shaft 6 when it is in the non-energized condition, and of disengaging their rotation when it is energized; in this manner, the phase coupling is maintained between the loom and the dobby even in the absence of electrical voltage.

The second electromagnetic clutch 17 has the function of rotatably coupling the shaft 6 with the wheel 9, when it is in the energized condition, and of disengaging their rotation when the relative electromagnet 18 is not energized.

In the conditions of normal weaving operation, illustrated in FIG. 1, the clutches 12 and 17 are both in the non-energized condition and therefore the shafts 1 and 6 are coupled together in rotation, while the wheel 9 is free, thus permitting synchronous actuation of the loom and the dobby. In the case where a breakage of a weft yarn takes place during operation, it is necessary to interrupt work and to unpick a length of fabric until the defect caused in the fabric by the breakage of the weft is eliminated.

Figure 2:
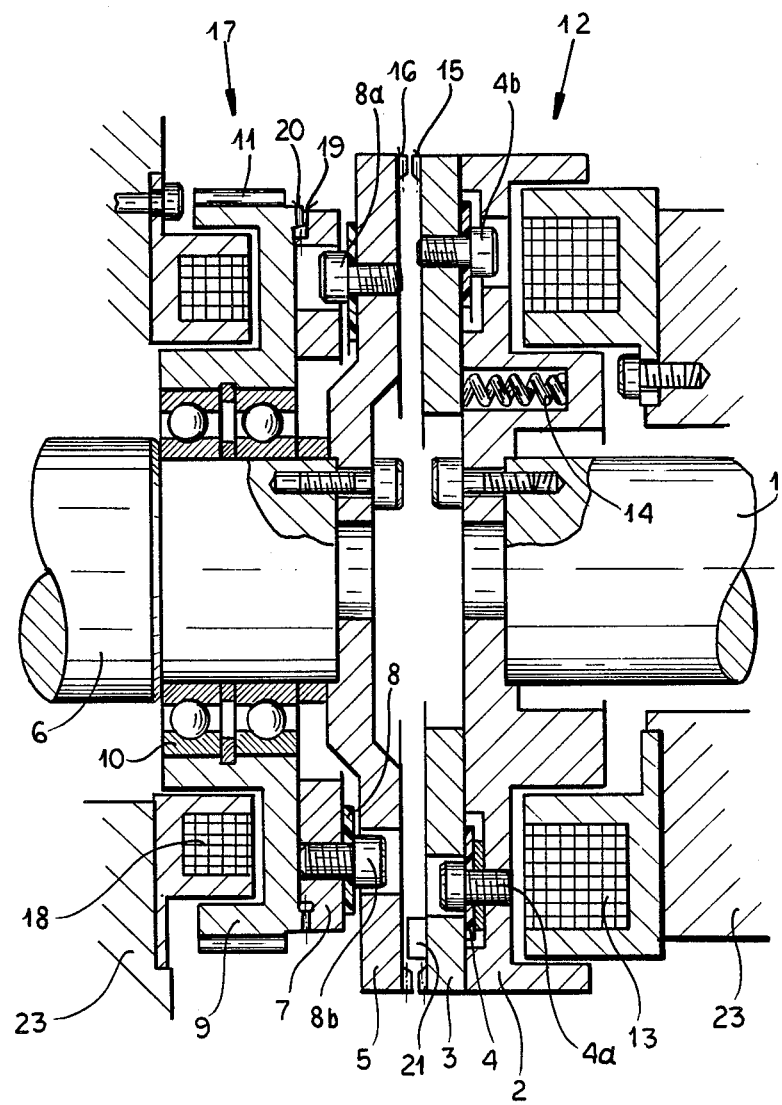
FIG. 2 is a similar view of the coupling of FIG. 1 in the condition of disengagement of the motor shaft from the driven shaft and transmission of motion to the driven shaft from an external motor device.

For this purpose, the loom is then stopped and the dobby is disengaged from the shaft 1 by energizing the clutch 12, which then is brought into the open position. The clutch 17 becomes energized, and rotatably couples the shaft 6 for actuating the dobby to the toothed wheel 9, thereby bringing the coupling into the arrangement illustrated in FIG. 2.

Figure 3:
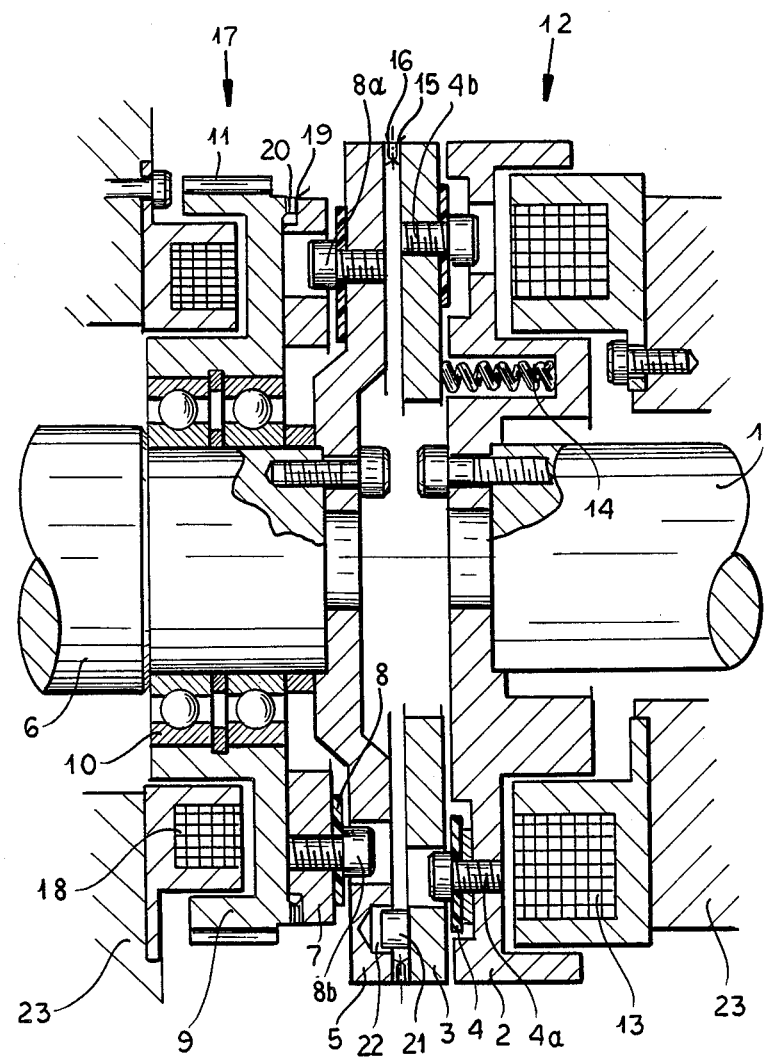
FIG. 3 is another axial section of the coupling of FIG. 1, in a condition of simultaneous engagement of the motor shaft with the driven shaft and of the driven shaft with the external motor device.

The auxiliary motor device 29 can then actuate reverse rotation of the dobby shaft, until access can be obtained to the point of the breakage in the weft in order to recommence continuity. In order to start up weaving again, it is necessary to bring the shafts 1 and 6 into the relative angular position that existed before the stoppage. For this purpose, the shaft 6 is set in rotation by the wheel 9 in the opposite direction to the foregoing, by keeping the electromagnet 18 energized, while power is cut off from the electromagnet 13. In this manner, as FIG. 3 shows, the springs 14 press the ring 3 onto the flanged element 5, causing the studs 21 to slide on the respective front surface of the flanged element until the studs 21 are opposite the corresponding holes 22, and enter these holes, thereby immediately causing closure of the clutch 12, thereby engaging the shafts 1 and 6 with each other in the same angular position that existed before the interruption of work. Simultaneously with the closure movement of the clutch 12, the electrical supply to the clutch 17 is cut off, thus leaving the loom and dobby coupled together for recommencement of weaving.

As illustrated in the foregoing, the constructions according to this invention provide, both for the clutch 12 and for the clutch 17, that the rotor, constituted respectively of the disc 2 and of the wheel 9, is mounted in an axially fixed position with respect to the respective electromagnets 13, 18. This mounting enables an extremely precise coupling to be achieved between the rotor and the electromagnet, thereby reducing to a minimum value the air gap existing radially between them, thus avoiding dissipation of the magnetic flux generated.

In fact, the disc 2, constituting the rotor of the clutch 12, is rigidly keyed to the shaft 1, which in its turn is supported inside the shell 23, by means of the bearings 24 illustrated in FIG. 4, which are able to guarantee a very high degree of precision in the position of the axis of the shaft 1 with respect to the casing or shell 23, to which the electromagnet 13 is rigidly attached.

In the same manner, the wheel 9, constituting the rotor of the clutch 17, is supported by the bearings 10, which permit a very high degree of support accuracy, on the shaft 6, which in its turn is supported by the bearings 25 in an axially fixed position with respect to the casing or shell 23, to which the electromagnet 18 is rigidly attached. In this manner it is possible, as stated, to use minimal values of the radial air gap dimensions between rotor and electromagnet and therefore to exert, by the electromagnets 13, 18, attraction forces on the associated armatures, constituted of the rings 3 and 7 respectively, of a particularly high value, which cannot be achieved with different configurations, for example of the type having an axial movement of the rotor, which demands the adoption of higher radial clearances suitable for permitting the axial sliding itself.

Figure 5:
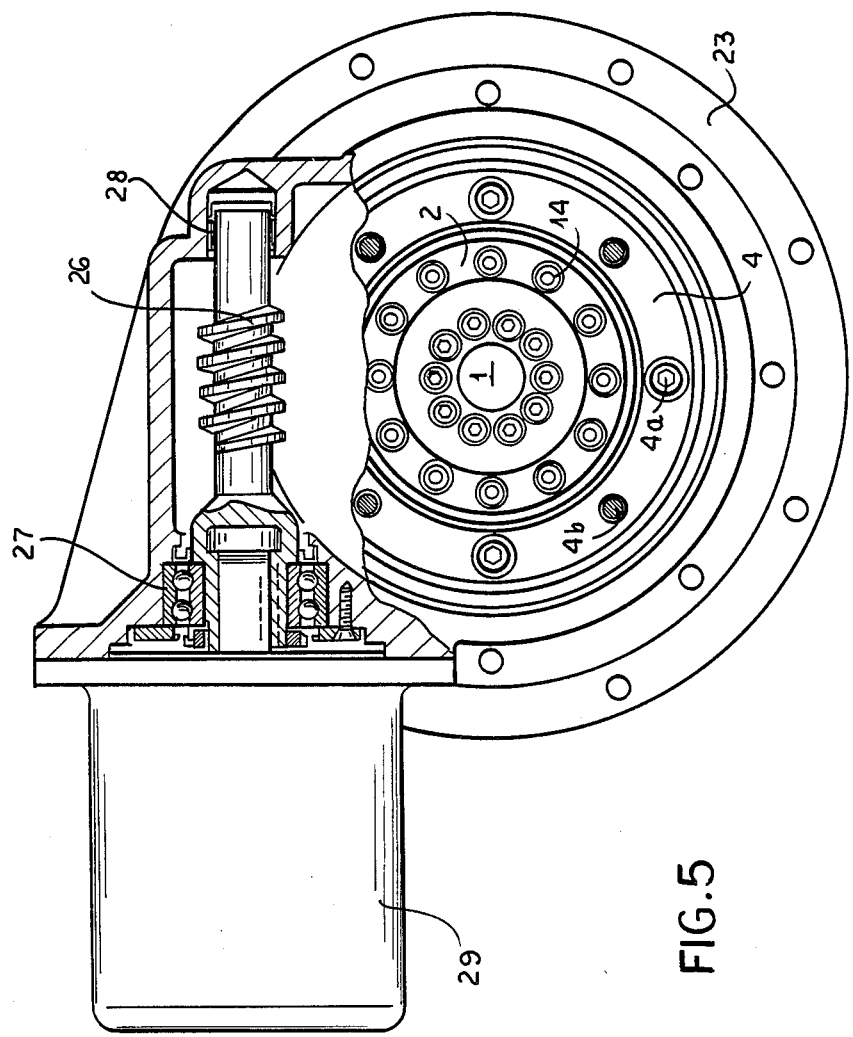
FIG. 5 is a section along line V-V of FIG. 4.

The position of the axially fixed support of the wheel 9, moreover, enables the wheel to be coupled to the auxiliary motor device by means of any type of transmission; in particular, transmissions having gears that demand precise axial positions of the elements in engagement can be used, for example pairs of bevel gears or, in the particularly advantageous form of embodiment illustrated in FIGS. 4 and 5, a gear pair constituted of a worm and a helically toothed wheel may be employed, by means of which it is possible to obtain directly a high reduction ratio, such as is required for the reverse movement of the dobby, without the use of further intermediate toothed elements.

The construction of the coupling according to this invention furthermore permits engagement and disengagement movements of the clutches having components subjected to axial sliding, for which clearances would be necessary, either with paired cylindrical surfaces, in the case where transmission of torque between the parts subjected to sliding is not required, or with splined profiles, if the components subjected to relative sliding must be torsionally keyed to one another.

In the first case, in fact, the clearances required would lead to defects in coaxiality between the components in relative sliding, with the aforementioned disadvantages in the case where said components form a magnetic circuit with radial air gaps, and with danger of crawling in the case of angular misalignment between the components themselves, whereas in the second case a torsional play would also occur between the components themselves, which would lead to unacceptable inaccuracy in coupling.

In the coupling according to this invention, the axially movable members are the clutch rings 3, 7, and their torsional coupling to the relevant axially fixed elements is assured by the flexible annular strips 4, 8, which ensure complete absence of torsional play, while permitting the axial displacements required, while the elements forming the magnetic circuits of the clutches are axially fixed, and therefore can be assembled with tight tolerances in respect of coaxiality, so as to achieve radial air gaps of reduced and constant size.

Numerous variants can be introduced, without thereby departing from the scope of the invention, in its general characteristics.

I claim:

1. A coupling apparatus, especially for a loom, said apparatus comprising:

a housing;

a driving shaft mounted in said housing and rotatable about an axis of rotation;

a driven shaft coaxial with said driving shaft, said driven shaft being mounted in said housing and being formed with a flange extending radially therefrom, said driving and driven shafts extending oppositely beyond said housing and being aligned;

a first clutch, said first clutch being formed with a first rotor coaxial with said driving shaft and rigidly connected thereto, said first rotor being provided with a first annular groove, a first annular electromagnet rigidly attached to said housing for producing electromagnetic force, said first electromagnet having an end spaced from said housing and inner and outer sides, said first electromagnet being received by said first annular groove and enclosing said inner and outer sides and said end of said first electromagnet, so that said first rotor and said first electromagnet define an air gap of a constant width all along said sides and said end, and an axially movable first annular armature rotatably fixed on said first rotor, said first annular armature being coaxial with said driving shaft and being connected by a first annular resilient means with said first rotor for providing continuous torsional connection of said first armature with said first rotor;

a second clutch provided with a second rotor coaxial with said driven shaft, said second rotor being rotatably mounted on but axially fixed on said driven shaft and being formed with a second annular groove, said second clutch including:

a second electromagnet fixedly attached to said housing, said second electromagnet being received in said second annular groove and having an end and inner and outer sides enclosed by said second annular groove so that said inner and outer sides and said end of said second electromagnet define another air gap of a constant width with said second rotor, and a second annular armature axially shiftable between said second rotor and said flange and coaxial with said driven shaft, said second armature being keyed on said flange, said second armature being provided with second annular resilient means connecting said flange with said second armature, so that said second armature shifts axially without play upon the energizing said second electromagnet;

coupling means on said axially movable first armature, said second armature, said flange and said second rotor for successive engaging - disengaging operations therebetween, so that upon energization of said first electromagnet, said axially movable first armature is disengaged from said flange, disengaging said driving and said driven shafts and upon energization of said second electromagnet said second armature is connected to said second rotor for reversed independent rotation of said driven shaft.

2. The coupling apparatus defined in claim 1, further comprising an auxiliary motor provided with another coupling means to said second rotor for operatively connecting said motor with said driven shaft upon the energizing of said second electromagnetic means.

3. The coupling apparatus defined in claim 1 wherein said first rotor is provided with means counteracting said first resilient means for urging said first armature against said flange upon the deenergization of said first electromagnetic means.

4. The coupling apparatus defined in claim 1 wherein said first armature is formed with studs on a side thereof facing said flange and said flange is provided with bores receiving respective studs during the coupling of said shafts.

5. The coupling apparatus defined in claim 2 further comprising connecting means provided on an outer periphery of said second rotor for connecting rotatably said driven shaft with said another coupling means of said motor.

6. The coupling apparatus defined in claim 5 wherein said connecting means are formed with a helical set of teeth.

* * * * *